March 17, 1964  G. MEISTER  3,125,457
ELECTROSTATIC COATING METHOD AND APPARATUS
Filed Dec. 5, 1961  3 Sheets-Sheet 1
FIG. 1.
FIG. 2.
FIG. 3.
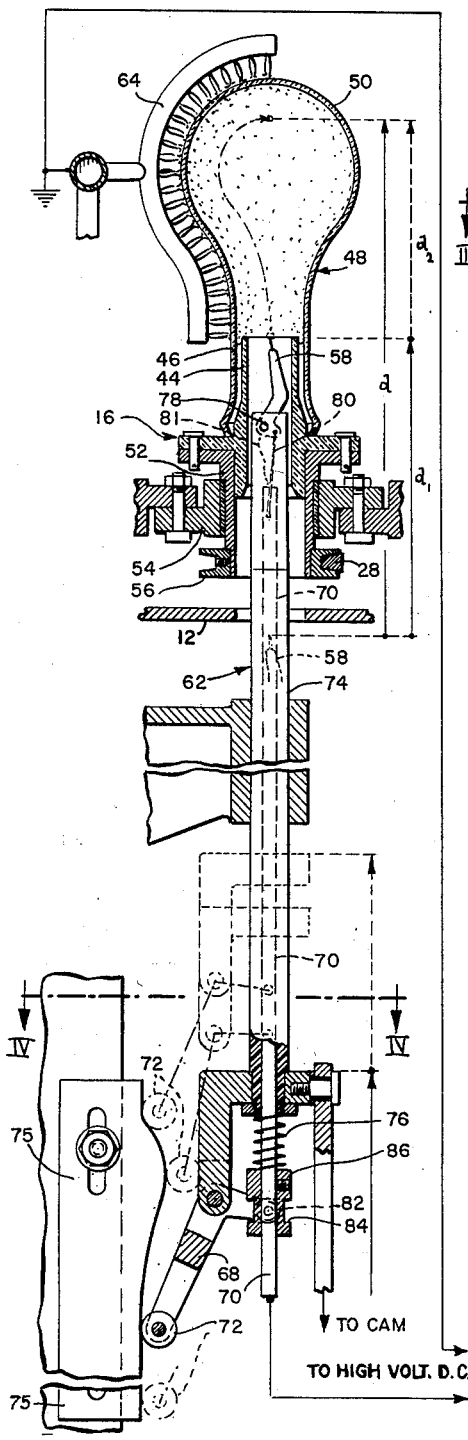
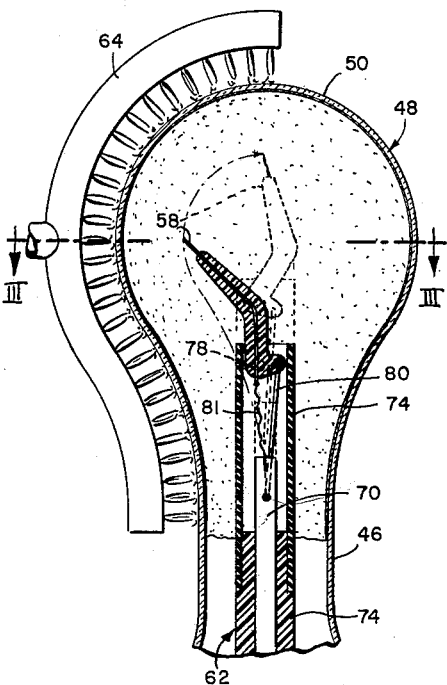
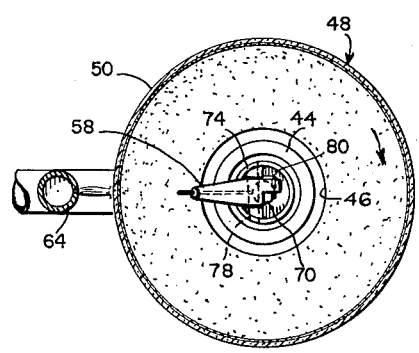
INVENTOR.
GEORGE MEISTER.
BY
W. D. Palmer
ATTORNEY.

March 17, 1964     G. MEISTER     3,125,457
ELECTROSTATIC COATING METHOD AND APPARATUS
Filed Dec. 5, 1961     3 Sheets-Sheet 2

INVENTOR.
GEORGE MEISTER
BY
W. D. Palmer
ATTORNEY.

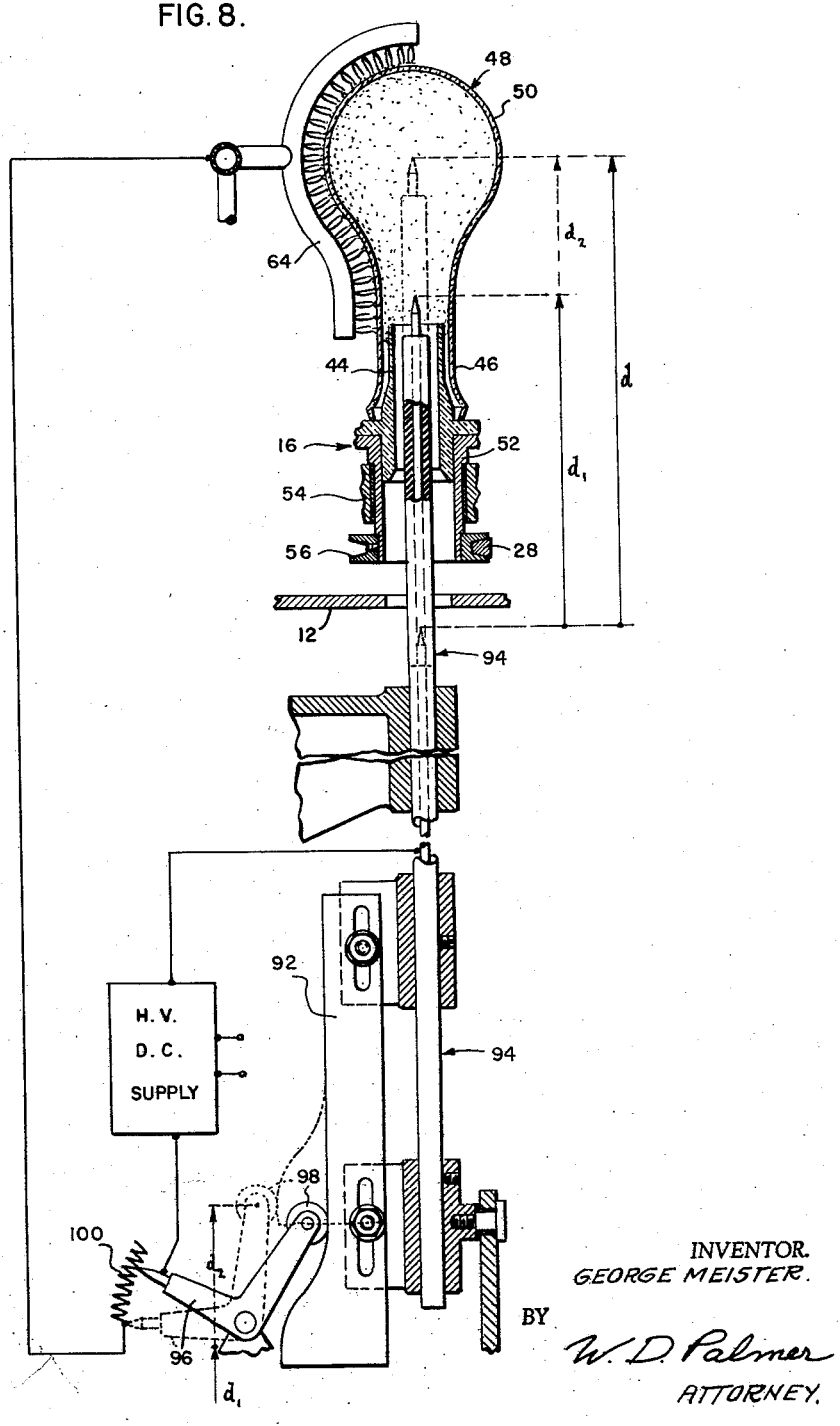

3,125,457
ELECTROSTATIC COATING METHOD AND
         APPARATUS
George Meister, Newark, N.J., assignor to Westinghouse
 Electric Corporation, East Pittsburgh, Pa., a corporation of Pennsylvania
         Filed Dec. 5, 1961, Ser. No. 157,219
                6 Claims. (Cl. 117—17)

This invention relates to a method and apparatus for coating bulbs and, more particularly, to a method and apparatus for improving the adherence of electrostatically deposited, light-scattering coating materials to incandescent lamp bulbs.

Incandescent lamp envelopes are desirably provided with a coating of finely divided, light-scattering particles on the inner envelope surface. Such a coating provides the lamp, when incandesced, with a very even appearance. The usual coating material is finely divided silica, or silica which has limited amounts of selected additives, and an electrostatic apparatus for depositing such material onto the inner surface of an incandescent lamp bulb is described in U.S. Patent No. 2,811,131, dated October 29, 1957.

When light-scattering materials such as silica are deposited by an electrostatic apparatus such as described in this aforementioned patent, troubles are sometimes encountered with respect to obtaining sufficient adherence of the coated particles to the envelope. Although the adherence is normally quite good, the margin of safety between "satisfactory" and "unsatisfactory" adherence is not as great as desired, with the result that slight misadjustment of the equipment may result in coatings which are not commercially acceptable. In U.S. Patent 2,995,463, dated August 8, 1961, is described a method and apparatus wherein a follow-up voltage is applied to the coated bulb, in order to compact the particles slightly and increase their adherence. Because of the configuration of an incandescent lamp bulb, the spacing between the follow-up-voltage electrode probe and the bulb neck is much smaller than the spacing between the follow-up-voltage electrode probe and the portion of the bulb which is proximate its maximum diameter. This results in creating at the bulb neck portion, an electrostatic field which is much more intense than the field which is generated proximate the maximum diameter of the bulb. As a result, the compaction of the coated particles due to the follow-up-voltage is greater at the neck portion of the envelope than at the bulbous portion thereof. It would be desirable for some applications to have a generally uniform adherence of the coated particles to all portions of the bulb.

It is the general object of this invention to provide a method for increasing the adherence of electrostatically deposited, finely divided coated material to the interior surface of a bulb, with the coated particles having a substantially uniform adherence throughout all bulb portions.

It is another object to provide a method for increasing the adherence of electrostatically deposited, finely divided coating material, preferably silica, so that such coating material uniformly adheres to all interior surfaces of an incandescent lamp bulb.

It is a further object to provide an improved incandescent lamp bulb electrostatic coating apparatus for producing coated bulbs which have uniformly adherent coatings.

The aforesaid objects of the invention, and other objects which will become apparent as the description proceeds, are achieved by providing a uniform, follow-up electrostatic field for the purpose of uniformly compacting and uniformly increasing the adherence of the coated particles to the bulb. One way of obtaining such a uniform field is to vary the voltage which is applied between the electrode probe and the bulb so that the field-creating voltage increases in accordance with the spacing between the electrode probe and the closest bulb portion. Another way of obtaining a uniform intensity electrostatic field is to change the electrode probe positioning in accordance with its positioning within the bulb, so that the inwardly extending portion of the probe is always a uniform distance from the closest portion of the coated bulb.

For a better understanding of the invention, reference should be had to the accompanying drawings, wherein:

FIGURE 1 is an elevational view, partly in section, taken at the follow-up-voltage station of an electrostatic coating apparatus;

FIG. 2 is a fragmentary enlarged view of the upper portion of the bulb at the follow-up-voltage station, as shown in FIG. 1, showing the electrode probe at its greatest off-center position and also, in dotted lines, at its uppermost position;

FIG. 3 is a sectional view taken on the line III—III in FIG. 2 in the direction of the arrows;

Figure 6:
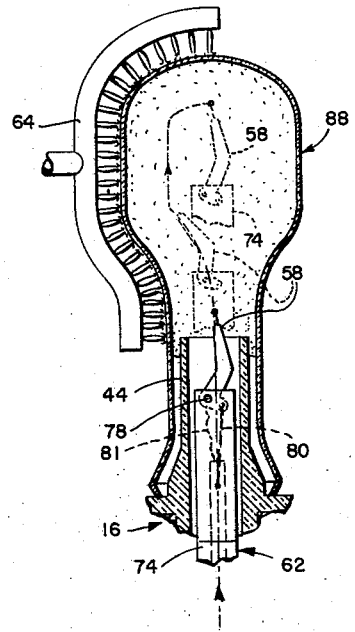
FIG. 6 is an elevational view, show partly in section, of a so-called T bulb in position on a follow-up-voltage station similar to that shown in FIG. 1.
Figure 7:
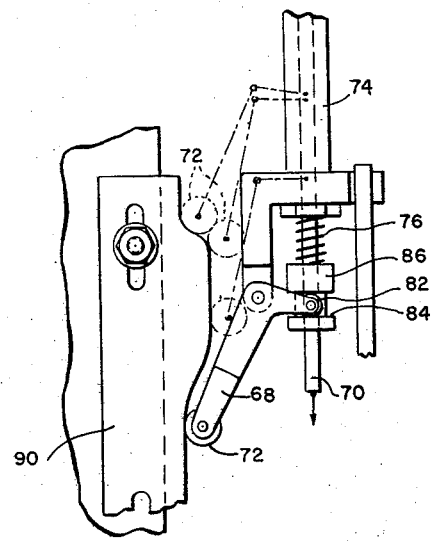

FIG. 7 is a fragmentary elevational view of an alternative cam for actuating the electrode probe to compact coated material onto a T bulb as shown in FIG. 6; and FIG. 8 is an elevational view, shown partly in section, of an alternative design for a follow-up-voltage station, wherein the high voltage which serves to compact the coated material is varied in accordance with the positioning of the electrode probe within the coated bulb.

While the method and apparatus as illustrated hereinbefore and as described hereinafter are useful for increasing the adherence of an electrostatically deposited, finely divided coating material to the interior surface of any type of envelope, the method and apparatus are particularly adapted for increasing the adherence of finely divided silica to the interior surface of incandescent lamp bulbs and hence have been so illustrated and will be so described.

Figure 5:
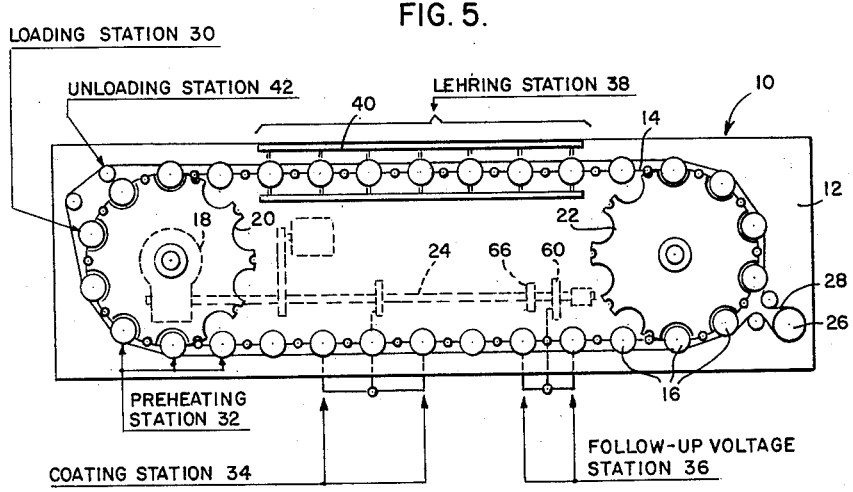
FIG. 5 is a diagrammatic plan view of the improved electrostatic coating apparatus of the present invention.

With specific reference to the form of the invention illustrated in the drawings, in FIG. 5 is shown in diagrammatic form an electrostatic coating machine which is generally similar to the machine described in the aforementioned U.S. Patent 2,811,131, which patent may be referred to for details. The machine is modified, however, to include a follow-up-voltage work station, which is broadly disclosed in the aforementioned U.S. Patent 2,995,463.

Briefly, the electrostatic coating machine 10 generally comprises a stationary table 121 having mounted thereon an indexing conveyor unit 14, which conveyor carries a plurality of bulb-receiving and bulb-retaining heads 16 through a plurality of work stations. These conveyor-carried heads are adapted to be indexed sequentially between each of the individual work positions or stations located about the table 12 and to remain for a predetermined period at each of the individual work stations. Indexing is accomplished by means of a motor-driven indexing drive 18, which connects to a sprocket drive 20 and a driven sprocket 22. The indexing drive 18 also connects to a cam shaft 24, so that the motions of the individual cams carried by the shaft 24 are synchronized with the indexing of the heads 16 about the table 12.

The envelope-carrying portion of each of the individual heads 16 is adapted to be rotated with respect to the table 12 and this rotation is accomplished by means of a motor drive 26 which connects to the individual heads 16 by means of a belt 28 to effect a rotation of the lamp-envelope-carrying portion of the heads 16.

In the operation of the coating machine 10, uncoated bulbs are loaded at station 30, either by hand or by automatic transfer mechanism. Thereafter the uncoated bulbs are indexed through a preheating work station 32, which can comprise three positions for example, where the bulbs are preheated by gas-air burners and simultaneously flushed with hot air to remove any lint. Preheating of the bulbs renders them substantially uniformly electrically conductive because of the negative temperature coefficient of resistance of glass. A suitable preheating temperature is about 100° C.

After preheating the bulbs are indexed through the coating work station 34 and thereafter to the follow-up-voltage work station 36, as will be described in detail hereinafter. The bulbs are then indexed through the lehring work station 38, which comprises seven positions. At the lehring work station 38, substantially all residual moisture is removed from the coated bulbs by means of a gas or infrared heated lehring tunnel 40. After lehring, the coated bulbs are indexed to the unloading station 42 where they are unloaded either by hand or by conventional automatic transfer mechanism for the next step of lamp fabrication.

A head 16, when indexed to one position of the follow-up-voltage station 36, is shown in FIG. 1. Each head 16 is identical and generally comprises a hollow, refractory, lava chuck 44 which is conformed to receive the neck portion 46 of a bulb 48 to retain the bulb throughout the coating and lehring operation.

Each bulb 48 is generally symmetrical and comprises a bulbous portion 50 terminating in the neck portion 46, which is open at this state of lamp manufacture. The chuck 44 of each head 16 is secured to a metal bearing 52 positioned within a journal bearing 54 to facilitate rotation of the chuck 44 with respect to the table 12. A pulley 56 connects to the bearing 52 and cooperates with the driving belt 28 to facilitate rotation of the bulb 48.

The head 16 is indexed into one work position of the follow-up-voltage station 36 with the follow-up-voltage assembly in retracted or rest position. The tip portion of the electrode probe 58 when in rest position is shown as a dotted line just below the table 12 in FIG. 1. After the head 16 is stationary in work position, the actuating cam 60 (see FIG. 5) causes the entire electrode probe assembly 62 to be elevated through a distance $d_1$ and into the neck portion 46 of the coated bulb 48.

When the coated bulb is in position at the follow-up-voltage work station 36 and the electrode probe 58 has been advanced into the neck portion 46 of the bulb through the distance $d_1$, a high-voltage D.C. potential is applied between the gas-air burner 64 and the electrode probe 58. The application of the high-voltage D.C. is continued for the entire period that the electrode probe 58 is moving within the neck portion 46 and the bulbous portion 50 of the bulb 48 through the distance $d_2$. Alternatively, the high-voltage D.C. need be applied only until the tip of the probe 58 has reached its uppermost position within the bulb 48. Simultaneously the bulb is rotated with respect to the gas-air burner 64, in order that the electrostatic field will be uniformly applied. The resulting electrostatic field is actually applied between the surface of the bulb 48 and the electrode probe 58, since the burning gas ionizes the air between the burner 64 and the bulb 48. Preferably, the gas-air burner 64 is maintained at ground potential in order to eliminate any shock hazards. This follow-up-voltage is applied for a total period of at least 0.5 second with the tip of the electrode probe 58 is moving within the bulb. The period for which the follow-up-voltage is applied can be greatly extended if desired. Proper timing of the applied follow-up-voltage is provided by a cam 66 (see FIG. 5), which actuates the high voltage D.C. supply (not shown). While two follow-up-voltage work stations have been shown in the diagrammatic view set forth in FIG. 5, only one station need be used, if desired, and the total time for which the follow-up-voltage should be applied should be at least 0.5 second, whether one or two follow-up-voltage stations are utilized. It is preferred to make the voltage which is applied to the electrode probe 58 negative with respect to the voltage which is applied to the gas-air burner 64 and the surface of the bulb 48.

Considering in greater detail the motion of the electrode probe 58 as it is moved still further into the bulb by the cam 60, an actuating lever 68 is pivotally affixed to a metallic connecting shaft 70 and carries a cam follower 72 at its extremity. The connecting shaft 70 is slidable within an insulating sleeve 74 and the electrode probe 58 is pivotally affixed to the upper portion of the sleeve 74. As the cam follower 72 is advanced into contact with the curved portion of the cam 75, as shown in dotted lines in FIG. 1, the connecting shaft 70 is moved against the compression of spring 76. This causes the tip of the electrode probe 58 to be rotated in a counterclockwise and then a clockwise direction. As a result the electrode probe tip follows a path which extends from the bulb neck to a location approaching the top portion of the bulb and back into the bulb neck. This path conforms to the interior configuration of the bulb. As shown in greater detail in FIG. 2, the electrode probe 58 is pivoted at point 78 on the insulating sleeve 74. A pivoted link 80 connects the probe 58 to the shaft 70. Electrical connection between the shaft 70 and the electrode probe 58 is maintained by a flexible conductor 81. The curved portion of the cam 75 is conformed to the interior configuration of the bulb so that the spacing between the tip of the electrode probe 58 and the closest interior surface of the bulb 48 is always substantially constant. Since the strength of the resulting electrostatic field is dependent both upon the applied voltage and the spacing between the tip of the electrode 58 and the bulb wall, the applied electrostatic field is of substantially constant intensity. As a result, the powder is substantially uniformly compacted over the entire interior surface of the bulb.

Figure 4:
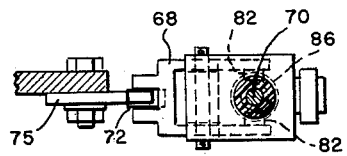
FIG. 4 is a sectional view taken on the line IV—IV in FIG. 1 in the direction of the arrows, showing constructional details for the operating cam and lever which actuate the electrode probe.

The designs of the probe-actuating cam 75 and the associated cam follower 72 are shown in greater detail in FIG. 4. The spring biased lever 68 is affixed to the connecting shaft 70 by means of a pair of rollers 82 which engage a horizontal groove 84 on a sleeve 86 fastened to the bottom of the shaft 70.

After the tip of the electrode probe 58 has reached its uppermost position, as shown in FIG. 2, the further rotation of the cam 60 causes the entire probe assembly 62 to retrace its path and return to rest position. Thereafter, the bulb-carrying head 16 is indexed to the next work station.

The magnitude of the applied follow-up-voltage is not critical and can be varied over an extremely wide range. As an example, the applied follow-up-voltage can be varied from 8 to 25 kv. for a 100-watt size incandescent envelope and even this wide range of applied voltage can be extended. As a specific example, the applied voltage is approximately 20 kv. for a 100-watt size envelope.

In FIGS. 6 and 7 are shown an alternative bulb 88 and the modified electrode probe actuating cam 90 which is cut to cause the probe 58 to follow a modified path in order to conform to the configuration of the so-called T bulb, as is now marketed commercially. In all other respects, the follow-up-voltage apparatus, as shown in FIGS. 6 and 7, is identical to that as shown in FIG. 1.

As an alternative embodiment for maintaining a substantially uniform electrostatic field to compact the coated material, the path of the tip of the electrode probe, as it passes into the interior of the bulb 48, can follow the center line of the bulb. In order to maintain a substantially uniform electrostatic field in such an embodiment, a voltage-actuating cam 92, as shown in FIG. 8, is affixed to the modified electrode probe assembly 94. A voltage actuating lever 96 which carries a cam follower 98 at one extremity, constitutes the control for a rheostat 100, to increase and decrease the voltage proportionally to the spacing betwen the probe of the modified electrode assembly 94 and the bulb wall. Thus the resulting applied electrostatic field is always substantially uniform. The shape of the voltage actuating cam 92, the resulting motion of the actuating lever 96 and that of the cam follower 98 are shown in dotted lines in FIG. 8, along with the motion of the probe of the modified assembly 94. As in the previous embodiments, the tip of the electrode probe traverses the distance "$d_1$" before the voltage is applied and the voltage is applied as the electrode probe tip traverses the distance "$d_2$."

It should be noted that while the preferred coating material which is compacted in silica, other finely divided and light-scattering, electrostatically coated materials can be compacted in accordance with the present invention.

It will be recognized that the objects of this invention have been achieved by providing a method for increasing the adherence of electrostatically deposited, finely divided coating material to the interior surface of a coated bulb, wherein the coated particles have a substantially uniform adherence throughout all bulb portions. In addition there has been provided an improved incandescent lamp electrostatic coating apparatus which will provide a very uniform adherence for coating material which is initially electrostatically deposited.

As an alternative embodiment to the present apparatus, a separate follow-up-voltage work station need not be used. In such a modified apparatus, the coating and follow-up-voltage work stations would be combined as one station. For example, the follow-up-voltage probe could be advanced into the coated bulb immediately after the coating nozzle was withdrawn. Alternatively, the follow-up-voltage probe and coating nozzle could be combined as one unit.

While best examples have been illustrated and described in detail, it is to be particularly understood that the invention is not limited thereto or thereby.

I claim as my invention:

1. The method of increasing the adherence of electrostatically deposited finely divided particles to the interior surface of an open-necked lamp bulb, which method comprises: heating the particle-coated bulb to render same substantially uniformly electrically conductive; applyig for a predetermined period between the bulb surface and a path within said bulb, spaced from said particle coating, and extending from a location bounded by the neck portion of said bulb to a location well within said bulb, a traveling electrostatic field of sufficient intensity to compact said coated particles and improve their adherence to said bulb; and maintaining at a substantially constant intensity the electrostatic field applied between the path within said bulb and the closest surface portion of said bulb.

2. The method of increasing the adherence of electrostatically deposited finely divided particles to the interior surface of an open-necked lamp bulb, which method comprises: heating the particle-coated bulb to render same substantially uniformly electrically conductive; applying for a period of at least 0.5 second between the bulb surface and a path within said bulb, spaced from said particle coating, and extending from a location bounded by the neck portion of said bulb to a location well within said bulb, a traveling electrostatic field of sufficient intensity to compact said coated particles and improve their adherence to said bulb; and maintaining at a substantially constant intensity the electrostatic field applied between the path within said bulb and the closest surface portion of said bulb.

3. The method of increasing the adherence of electrostatically deposited finely divided particles to the interior surface of an open-necked lamp bulb, which method comprises: heating the particle-coated bulb to render same substantially uniformly electrically conductive; applying for a period of at least 0.5 second between the bulb surface and a path within said bulb, spaced from said particle coating, and extending from a location bounded by the neck portion of said bulb to a location well within said bulb, a high-intensity unidirectional potential to generate an electrostatic field of sufficient magnitude to compact said coated particles and improve their adherence to said bulb; and varying the applied high-intensity unidirectional potential in accordance with the spacing within said bulb across which such potential is applied to maintain at a substantially constant value the resulting particle-compacting electrostatic field.

4. The method of increasing the adherence of electrostatically deposited finely divided particles to the interior surface of an open-necked lamp bulb, which method comprises: heating the particle-coated bulb to render same substantially uniformly electrically conductive; applying for a period of at least 0.5 second between the bulb surface and a path within said bulb, spaced from said particle coating, and extending from a location bounded by the neck portion of said bulb to a location well within and approaching the top portion of said bulb, a substantially constant high-intensity unidirectional potential of sufficient magnitude to compact said coated particles and improve their adherence to said bulb; and maintaining substantially constant the spacing across which said high-intensity unidirectional potential is applied to maintain the resulting particle-compacting electrostatic field substantially constant.

5. In combination with an electrostatic coating machine for applying to an open-necked lamp bulb a coating of finely divided particles, the improvement which comprises, a follow-up-voltage means for improving the adherence of particles as initially coated onto said bulb, said follow-up-voltage means comprising, gas-heating means for maintaining said initially coated bulb substantially uniformly electrically conductive and to facilitate electrical contact to said bulb, electrode probe means adapted to move through the open neck of said bulb to a position well within and approaching the top portion of said bulb, timing means to control the travel of said probe means within said coated bulb so that said probe means moves within said coated bulb for a period of at least 0.5 second, means for rotating said bulb with respect to said probe means, means for applying a substantially constant unidirectional high-voltage potential between the inwardly projecting portion of said probe means and the surface of said bulb to compact said applied particle coating, voltage timing means for applying said potential between said probe means and the surface of said conducting bulb for at least 0.5 second while the inwardly projecting portion of said probe means is moving from a position bounded by the neck portion of said bulb to a position well within and approaching the top portion of said bulb, means for varying the positioning of the inwardly projecting portion of said probe means as said probe means is inserted into said bulb to maintain substantially constant the spacing between such inwardly projecting probe means portion and the closest surface of said bulb to maintain the particle-compacting electrostatic field substantially constant, means for holding said coated bulb in position at said follow-up-voltage means, and means for moving said coated bulb to and from said follow-up-voltage means.

6. In combination with an electrostatic coating machine for applying to an open-necked lamp bulb a coating of finely divided particles, the improvement which comprises, a follow-up-voltage means for improving the adherence of particles as initially coated onto said bulb, said follow-up-voltage means comprising, gas-heating means for maintaining said initially coated bulb substantially uniformly electrically conductive and to facilitate electrical contact to said bulb, electrode probe means adapted to move through the open neck of said bulb to a position well within said bulb, timing means to control the travel of said probe means within said coated bulb so that said probe means moves within said coated bulb for a period of at least 0.5 second, means for rotating said bulb with respect to said probe means, means for applying a unidirectional high-voltage potential between the inwardly projecting portion of said probe means and the surface of said bulb to compact said applied particle coating, voltage timing means for applying said potential between said probe means and the surface of said conducting bulb for at least 0.5 second while the inwardly projecting portion of said probe means is moving from a position bounded by the neck portion of said bulb to a position well within said bulb, means for varying the applied high-intensity unidirectional potential in accordance with the spacing between the inwardly projecting portion of said probe means and the closest portion of the surface of said bulb to maintain at a substantially constant value the resulting particle-compacting electrostatic field, means for holding said coated bulb in position at said follow-up-voltage means, and means for moving said coated bulb to and from said follow-up-voltage means.

References Cited in the file of this patent

UNITED STATES PATENTS 2,995,463    Meister et al. _____ Aug. 8, 1961